April 14, 1936.    W. R. MARTIN    2,037,425
MEANS FOR MEASURING FLUID PRESSURES
Filed Jan. 23, 1931    2 Sheets-Sheet 1
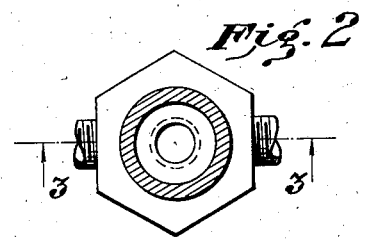
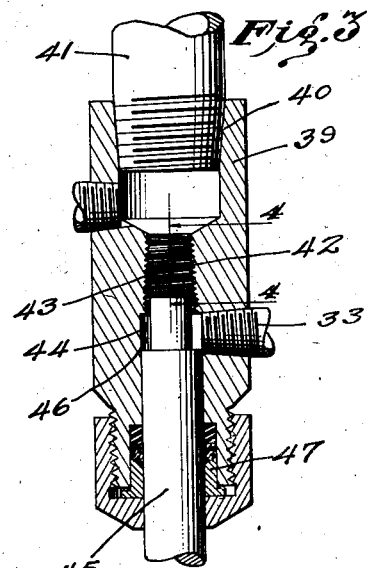
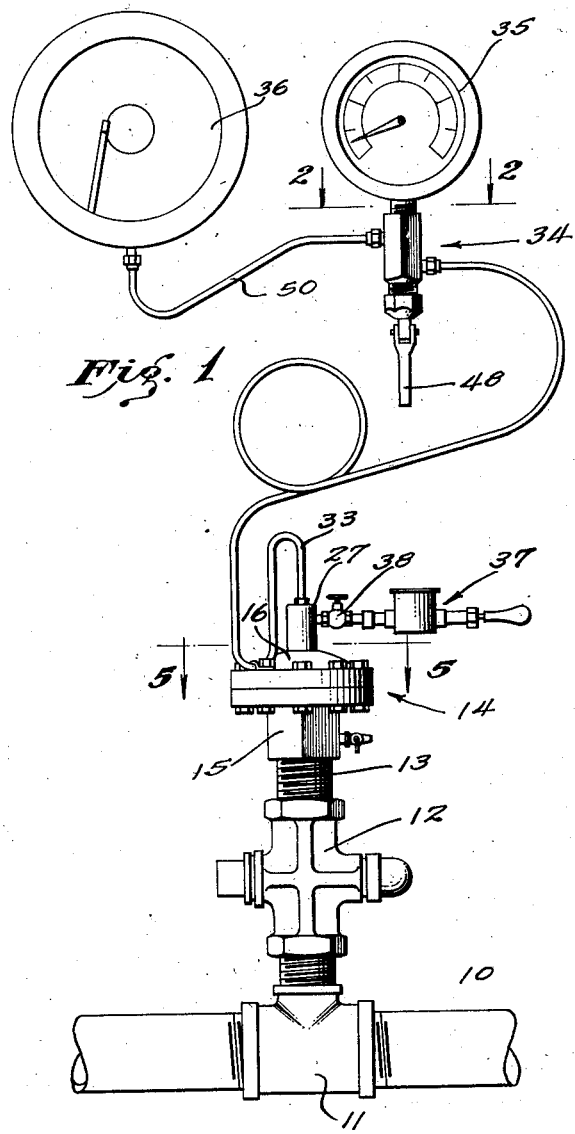
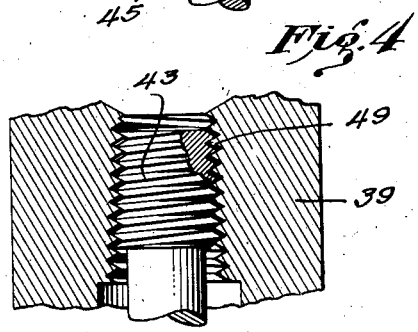
INVENTOR.
WALTER R. MARTIN.
BY Townsend, Loftus & Abbett
ATTORNEYS.

April 14, 1936. W. R. MARTIN 2,037,425
MEANS FOR MEASURING FLUID PRESSURES
Filed Jan. 23, 1931 2 Sheets-Sheet 2
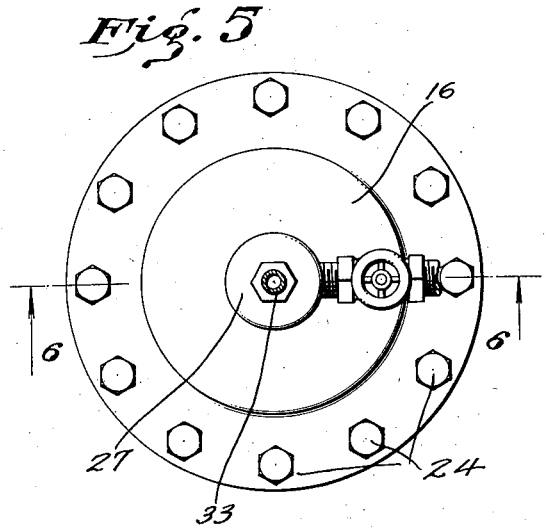
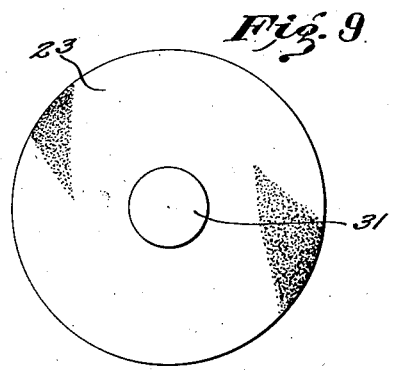
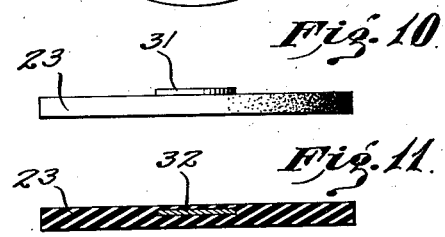
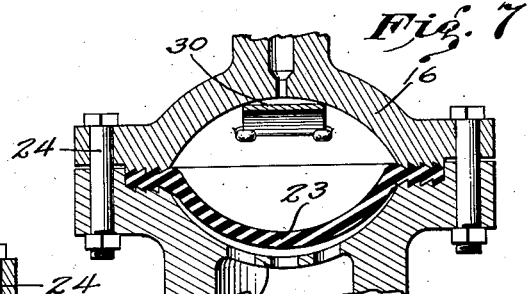
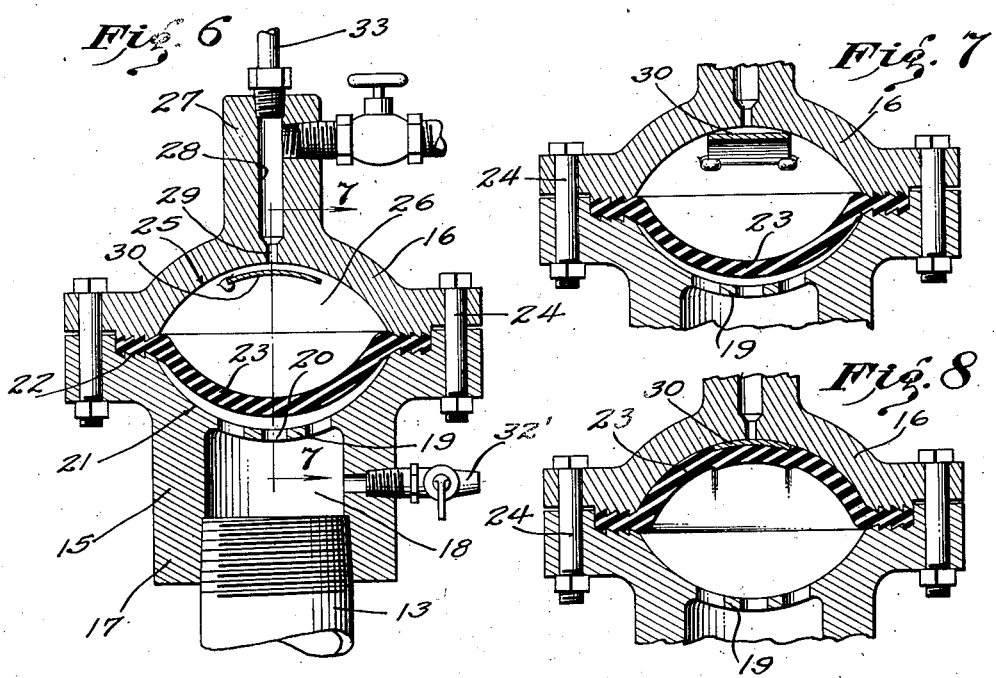
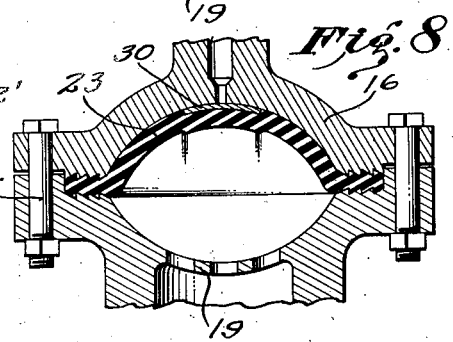
INVENTOR.
WALTER R. MARTIN,
BY Townsend, Loftus + Abbett
ATTORNEYS Patented Apr. 14, 1936

2,037,425

UNITED STATES PATENT OFFICE 2,037,425

MEANS FOR MEASURING FLUID PRESSURES

Walter R. Martin, Long Beach, Calif., assignor to Martin-Decker Corporation, Long Beach, Calif., a corporation of Delaware Application January 23, 1931, Serial No. 510,642

5 Claims. (Cl. 73—31)

This invention relates to means for measuring pressures and particularly pertains to means for determining pulsating pressures.

In drilling oil wells operating pressures under severely pulsating service are often encountered in pumping corrosive, abrasive, and contaminating fluids such as the mud used. This mud is circulated through the drill pipe to and around the bit and then returns to the surface through the well bore. It is essential at many times to maintain rapid circulation of this fluid and consequently pumps labor at high speeds while creating severe pulsation conditions. The fluid used in these operations is highly abrasive and contaminating and will clog rapidly and harden quickly upon exposure to air, in fact it may even clog at times merely upon a reduction of velocity. The extremely high pressures under which this fluid is pumped also necessitate extraordinary precautions to prevent leakage of the contaminated liquid into the gauge system under normal as well as adverse conditions.

It is highly desirable to maintain an accurate record of pumping pressures and to constantly be able to ascertain them, since such indications will show many things, including among others when a drill bit is plugged and when the threaded connections of the drill pipe are cutting out as well as indicate when cuttings have settled around the bit and when the bit has worn out of gauge and is drilling an undersize hole.

A particular object of the present invention is to combine means for measuring the pressure of the mud fluid and by the provision of safety features to prevent the possibility of mud reaching these gauges even under the adverse operating conditions usually encountered. It is also desirable to protect the tubing connections, gauge fluid system and sealing means against the force of severe pulsations of high pressure mud pump operation. Another object of this present invention is to provide a sealing unit in which such safety features are incorporated and in conjunction therewith a dampening unit which may be made effective to eliminate the pulsations of the gauge fluid system, regardless of conditions of pressure, temperature or pulsation, the structure being so designed as to eliminate vibration in the gauge system which would become leaky due to the pulsating pressure and thereby render the device inaccurate or inoperative.

The invention is illustrated by way of example in the accompanying drawings, in which:

Figure 1 is a fragmentary view in side elevation showing the complete apparatus with which the invention is concerned.

Fig. 2 is a view in section through a choke valve as seen on the line 2—2 of Fig. 1.

Fig. 3 is a view in longitudinal section through the choke valve as seen on the line 3—3 of Fig. 2.

Fig. 4 is an enlarged fragmentary view of the threaded valve portion of the choke valve, as seen on the line 4—4 of Fig. 3.

Fig. 5 is an enlarged view in plan showing the top of the diaphragm chamber as seen on the line 5—5 of Fig. 1.

Fig. 6 is a view in transverse section through the diaphragm chamber as seen on the line 6—6 of Fig. 5.

Fig. 7 is a fragmentary view in transverse section through the diaphragm chamber as seen on the line 7—7 of Fig. 6.

Fig. 8 is a view similar to Fig. 7, showing the diaphragm in its extreme pressure position.

Fig. 9 is a view in plan showing one form of the diaphragm.

Fig. 10 is a view in side elevation showing the diaphragm.

Fig. 11 is a view in transverse section through a form of diaphragm showing a reinforcing disc embedded at the center thereof.

Referring more particularly to the drawings, 10 indicates a pipe through which mud is circulated in well drilling operations. This pipe is shown in Fig. 1 as being fitted with a T 11 to which a cutoff valve 12 is connected. The valve 12 is also fitted with a connection to a pipe 13 which leads to a substantially vertically mounted diaphragm cage 14. This cage comprises a lower casting 15 and an upper casting 16 fitted with complementary bolting flanges by which the two castings are secured together. The diaphragm cage is more particularly shown in Fig. 6 of the drawings, where it will be seen that the lower casting 15 is formed with a downwardly extending tubular portion 17 to receive the pipe 13. At the end of the pipe 13 and within the tubular portion 17 of the casting 15 is a passageway 18 which is formed at its end with an end wall 19 having perforations 20 therethrough. The casting 15 is formed with a concaved portion 21 of which the wall 19 is the central part. Circumscribing the mouth of the concaved portion 21 is serrated seat 22 to receive the edge of a flexible diaphragm 23. The casting 16 is disposed over the casting 15, as previously described, and is fastened down against the lower casting by bolts 24. The opposite faces of the castings 15 and 16 engage the edge of the flexible diaphragm 23 and rigidly clamp it in position preventing the diaphragm from being loosened and pulled into the chamber formed between the castings 15 and 16.

The diaphragm 23 is disposed within its seat between the castings 15 and 16 and compressed therebetween. The diaphragm 23 may be made of suitably corrugated or extremely flexible metal or as in the illustration may be composed of rubber or other composition. When the diaphragm is of rubber it is molded preferably as a flat disc of considerably greater thickness than the distance between the clamping portion of the seat 22 and the opposed portion of the upper casting 16, when completely drawn together by bolts 24. Thus an excess of diaphragm stock flows into the central portion and concaves it downwardly as shown in Fig. 6. This provides sufficient excess stock and an initial compression in the material to accommodate the fluctuations under pressure pulsations. It will be noted that the diaphragm is completely enclosed by the flanges of castings 15 and 16 and that pressure from the inside would tend to force the material of the diaphragm into the opening between such flanges to form a pressure packed seal. There are no bolt holes through the diaphragm tending toward weakening or to provide possible leakage points. The upper casting 16 is formed with a concaved portion 25 which combines with the concave portion 21 to form a spheroidal diaphragm chamber 26.

It is to be understood that the diaphragm may flex from a downwardly protruding position as shown in Figs. 6 and 7, to an oppositely and upwardly protruding position as shown in Fig. 8. The diaphragm is acted upon by pressure which may under certain conditions cause it to move from one extreme position to the other. In some instances suction may act upon the diaphragm to pull it downwardly against the concaved face 21 of the lower casting 15. The wall 19 is provided so that the diaphragm will be reinforced and will not be weakened or ruptured by the suction action. Also it is a well known property of rubber to flow and creep under stress. Continued operation of suction upon the diaphragm would tend to successively draw it further and further out from between the castings 15 and 16. The wall 19 thus limits the movement of the diaphragm and thus prevents this occurrence.

The upper casting 16 is formed with a central cylindrical portion 27 having a central bore 28 therein. The lower end of this bore is reduced in diameter to form a duct 29 which communicates with the chamber 26. A reinforcing spring 30 is disposed within the upper casting 16 and is flexed to partially agree with the sectional contour of the concaved portion 25. It will be observed that this spring itself does not seal off the duct 29 in its normal condition. Further to insure that unusual pulsation will not cause the fluid to so flex it as to effect a seal, the casting surrounding the duct 29 is left unfinished and rough. However, should the fluid escape from connections beyond the bore 28 so as to cause unbalanced pressure within the chamber 26 the diaphragm will be forced against the spring 30 flexing it to conform with the casting 16 to close the duct 29. The material of the diaphragm will then effectively seal around the edges and prevent rupture of the diaphragm and the escape of fluid from below the diaphragm into the connecting system above it. It will thus be seen that the combination of spring and diaphragm is utilized to effect the complete seal. In other words, as long as there is fluid in the chamber 26 above the diaphragm, pressure transfer through the duct 29 and bore 28 will not be restricted. However, exhaustion of this fluid will cause the diaphragm 23 and spring 30 to cooperate to effect a seal. Such a structure likewise permits the use of extremely flexible and resilient diaphragm material as the spring 30 prevents the diaphragm 23 from being forced into the duct 29 under conditions of unbalanced pressure, and at such times ruptured or perforated. The normal position and relative width of the spring is shown in Fig. 7 of the drawings, while Fig. 8 shows the spring under conditions of extreme pressure and flexure. The diaphragms may be further reinforced by an additional reinforcing disc of more rigid material 31 as shown in Fig. 10, or a disc 32 embedded in the diaphragm as shown in Fig. 11. With the 20 latter types of diaphragms the spring 30 may in some cases be omitted.

A drain valve 32' is connected with the chamber 26 through the casting 15. The drain valve enters the body a slight distance below the normal diaphragm position. It is opened occasionally during use to insure that the chamber below the diaphragm is filled with fluid material, to drain off oil or to release excessive quantities of air or gas which may become trapped there due to the vertical position of the unit. When the valve 12 is closed for adjustments or filling the drain valve 32' is opened to relieve the pressure beneath the diaphragm so that connections may be broken or the system filled. The passageway 28 in the casting 16 communicates with a pressure tube 33 leading to a choke valve structure 34 and which structure regulates the fluid flow to an indicator 35 and a recording device 36, as will be hereinafter described. A pump structure 37 is connected with the bore 28 through a pet cock 38. After initial installation or upon leakage of fluid this pump is used to fill the tubing, gauges, and the space above the diaphragm with balancing fluid.

The choke valve structure is shown in detail in Figs. 2 to 4, inclusive, where it will be seen that it comprises a housing 39 having a relatively large threaded opening 40 at its upper end to receive a pipe 41 connecting it with an indicator 35. At the lower end of the opening 40 is a passageway 42 which is formed with a burnished tapered internal thread to receive a threaded choke plug 43 which cooperates with the threaded bore 42 to provide a choke valve. A passageway 44 is formed in longitudinal alignment with the large passageway 40 and the threaded bore 42. This passageway receives the stem 45 of the choke plug 43. The stem 45 is reduced in diameter at its threaded end forming an annular passageway 46 around which fluid may flow from the pressure tube 33. A stuffing gland 47 is formed at the end of the valve housing and accommodates the stem 45. An operating lever 48 is secured at the end of the valve stem and provides a convenient means for its rotation. The choke valve operates to permit fluid to pass around and along the tapered threads of the choke plug 43 and the complementary bore 42. This passageway is indicated at 49 in Fig. 4. It will thus be evident that as the valve 43 is screwed into position the sectional area of the space 49 will decrease in microscopic proportions so that the volume of fluid flowing to the indicator 35 and the recording device 36 may be regulated to a nicety. The recording device 36 is connected with the valve structure 34 by a tube 50.

In operation of the present invention the structure is assembled as shown in the drawings and attached to a pipe 10 through which fluid flows under pressure. The tubing, gauges, and chamber 26 above the diaphragm 23 are filled with fluid through the pump 37 and the pet cock 38 is then closed. Air in the system is bled off by loosening the connections at the high points in the system so that the system is completely filled with balancing fluid. The fluid used is generally water; or water-alcohol, or water-glycerine mixtures where protection against freezing is desired. Preferably the fluid will be such that its viscosity will be low and will remain substantially constant within normal atmospheric temperature ranges. This, though desirable, is not necessary due to the adjusting feature of the choke valve 34. Should the spring 30 and diaphragm 23 seal off the duct 29 through fluid leakage as above described, leakage of the fluid will be taking place and the gauge pressure will drop indicating to the operator that such is the condition. He may then check the leakage, refill the system and proceed as before. The fluid at which the pressure is to be measured will enter the passageway 18 and will be forced through the opening 20 of the wall 19 into the chamber 26 and against the diaphragm 23. This diaphragm will act against the fluid on the opposite side of the diaphragm to force it through the pipe 33 and into the choke valve 34. In the event of a condition of suction in the pipe 10, such as might be the case during the movement of the drill stem within the well bore, or in case of excessive reverse pressures due to overfilling with the pump, the wall 19 will prevent an excessive load from being imposed upon the diaphragm 23 to draw it downwardly. When excessive unbalanced pressures are created, as through fluid leakage, the diaphragm 23 will be flexed to its extreme upper position, as indicated in Fig. 8, at which time the reinforcing spring 30 will be interposed between the diaphragm and the duct 29 to prevent the pressure from causing the diaphragm to be ruptured and a portion of it forced into the duct. Should the diaphragm become deteriorated through contact with crude oil, sulphur gases or through age or exposure to heat, so that it no longer completely separates the fluids, it will still be able to form a sufficient seal around the spring 30 to prevent entrance of mud into the gauge system. The speed of pressure transfer from the pipe 33 to the gauges may be accurately regulated by the choke valve structure 34, as previously described. Properly regulated the choke valve structure 34 will limit the pulsation through the system and prevent rapid vibration of the diaphragm as well as of the gauges. Due to the extreme fluctuation of pressure in such systems it has been very difficult to obtain diaphragm material which will withstand such service for any length of time. By the inter-position of this choke valve 34 between the diaphragm and the gauges an effective protector is introduced for both units. The transfer of fluid to the gauges to cause them to expand is reduced in its speed to such as will cause a uniform non-pulsating movement of registry regardless of the rapidity and force of the external pulsations. Due to the extremely small size of its passage the choke valve structure likewise provides an effective secondary seal against foreign matter or mud entering the gauge elements proper. Such foreign matter would, of course, obstruct the passage and cause the gauges to register improperly. However, such inoperativeness of the gauges will be apparent and with the valve 12 closed and the pressure bled off through the drain valve 32' the stuffing gland 41 and threaded choke plug 43 may be completely removed, cleaned, and the passage 42 and 44 cleaned out, to remove the obstruction. Reassembly and refilling of the system and opening of the valve 12 will again place the gauges in operation with a minimum loss of time.

Attention is directed to the fact that indicating devices of the present type have varying factors of operation under varying pressure conditions. The choke valve structure here used makes it possible to instantly and accurately regulate the apparatus to meet these requirements.

It will thus be seen that the device here disclosed provides means for accurately measuring the pressure of a fluid flowing in a pipe, irrespective of whether that pressure is constant or pulsating, and to directly indicate and record the pressure of a flowing fluid.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:—

1. Means for indicating the mean pressure of a pulsating fluid which comprises a pressure chamber, a flexible diaphragm dividing said pressure chamber into two compartments, a conduit connected with one of said compartments within which a stagnant fluid is disposed, a conduit in connection with the other of said compartments into which the moving pulsating fluid may flow, means cooperating with the diaphragm for closing off the flowing fluid from the pressure chamber when a predetermined minimum pressure of said fluid prevails, means cooperating with said diaphragm for closing off the stagnant fluid from the pressure chamber when a predetermined pressure of the stagnant fluid prevails, and an indicating device operatively connected with the column of stagnant fluid to indicate variation in pressure of the flowing fluid during the range of movement of the diaphragm between its two fluid closing positions.

2. Means for indicating pressure including a pressure chamber having openings through the opposite walls thereof, a flexible diaphragm separating the pressure chamber into two compartments, separate sources of pressure fluid delivered to said compartments through their respective openings in the pressure chamber, one compartment for each of said fluids and whereby variation in the relative pressures of the two fluids will cause flexure of the diaphragm, and a maximum variation in the pressures of the two fluids will cause the diaphragm to seal the opening in the pressure chamber through which the minimum pressure fluid is contained and means for optionally imposing a minimum pressure upon one of the fluids to determine the pressure at which either of the fluid openings of the pressure chamber can be closed by the diaphragm, and yieldable flexible means interposed between the diaphragm and a fluid opening whereby excess pressure would not cause rupture of the diaphragm when closing said opening.

3. Means for indicating the pressure of pulsating fluid which comprises the provision of a pressure chamber having openings in the opposite side walls thereof, a conduit delivering a pulsating fluid to the pressure chamber through one of said openings, a conduit delivering a stagnant fluid to the pressure chamber through the other of said openings, a gauge affected by variation in pressure of the stagnant fluid, a diaphragm dividing the pressure chamber into two compartments, said diaphragm being capable of alternate flexure to close the openings to the pressure chamber through which the stagnant fluid and the pulsating fluid pass when said fluids have a predetermined variation in pressure with relation to each other, and means for varying the pressure of the stagnant fluid to determine the pressures at which the diaphragm would close either of said openings.

4. A protector for pressure gauges consisting of a casing having a domed upper section, said upper section having a relatively small opening at the center of the dome, a diaphragm interposed between said upper section and the remainder of the casing, a perforated domed shaped member positioned below said diaphragm and a bleeder valve in the casing below the diaphragm.

5. An apparatus for registering pressures of fluids which consists of a casing having a dome-shaped section, a perforated dome-shaped guard positioned within said casing and forming in combination with said section of the casing an approximately spherical chamber, a relatively thin elastic diaphragm stretched across said chamber, a conduit for transmitting a fluid under pressure through the guard to one side of said diaphragm and a pressure gauge in liquid communication through a relatively small conduit with the other side of the diaphragm, said diaphragm being adapted to flex into closing relation to said pressure gauge conduit upon relief of pressure in the gauge conduit.

WALTER R. MARTIN.